No. 679,279. Patented July 23, 1901.
F. J. FAIRCHILD.
TRUCK ATTACHMENT.
(Application filed Nov. 19, 1900.)
(No Model.)
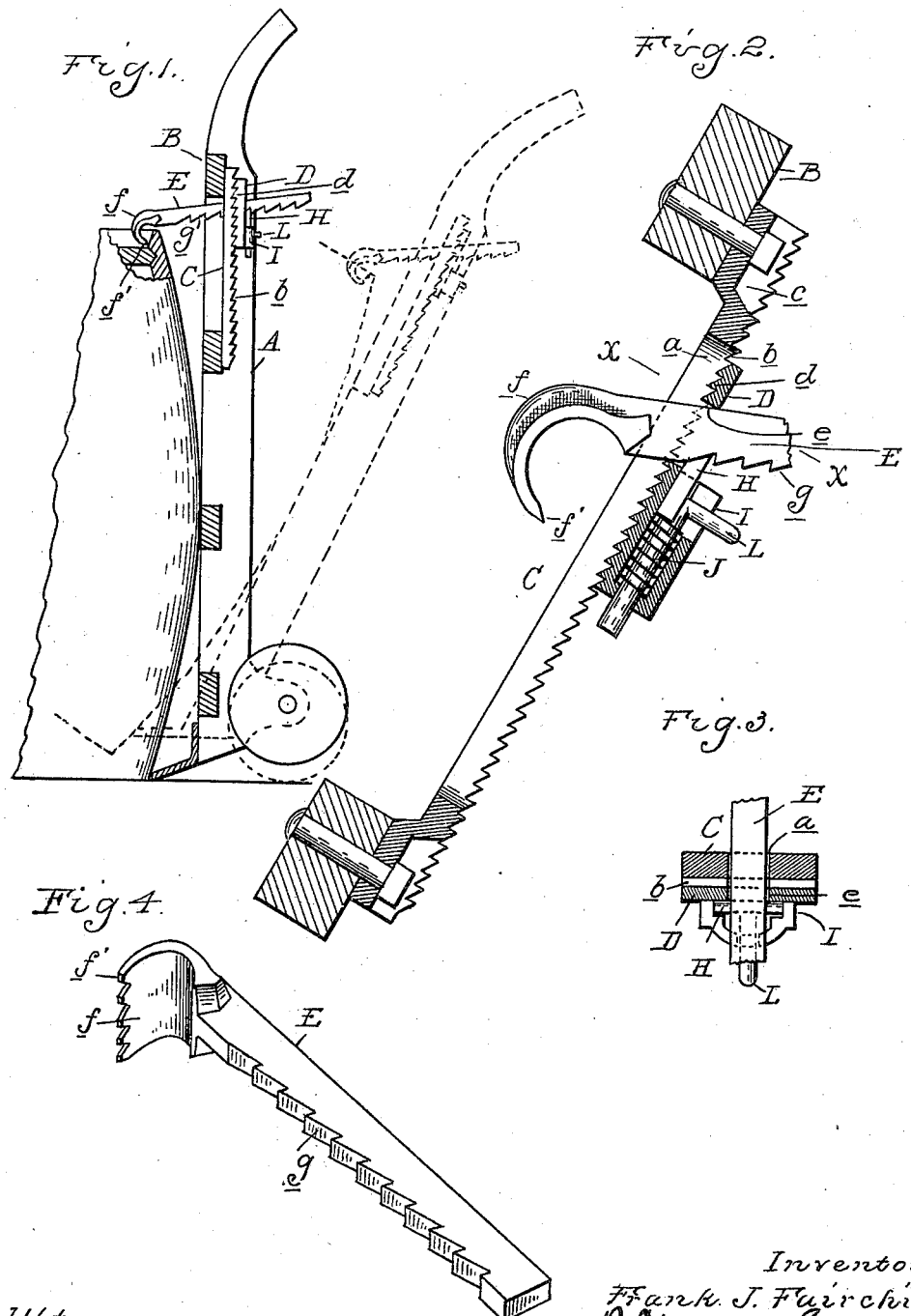
Witnesses
Inventor
Frank J. Fairchild

UNITED STATES PATENT OFFICE.

FRANK J. FAIRCHILD, OF DETROIT, MICHIGAN, ASSIGNOR TO HAND TRUCK ATTACHMENT COMPANY, LIMITED, OF SAME PLACE.

TRUCK ATTACHMENT.

SPECIFICATION forming part of Letters Patent No. 679,279, dated July 23, 1901.

Application filed November 19, 1900. Serial No. 37,030. (No model.)

*To all whom it may concern:*

Be it known that I, FRANK J. FAIRCHILD, a citizen of the United States, residing at Detroit, in the county of Wayne and State of Michigan, have invented certain new and useful Improvements in Truck Attachments, of which the following is a specification, reference being had therein to the accompanying drawings.

The invention relates to attachments to hand-trucks especially designed for assisting in loading of barrels, boxes, &c., on the truck.

It is the object of the invention to provide a device which may be readily engaged with any article which it is desired to load upon the truck, and which will securely hold the article while being carried and at the same time may be readily disengaged for unloading.

The invention consists in the peculiar construction of a loading-hook having a notched shank, together with a bolt adapted to engage with said notches, a head to which said bolt is secured, and a bar extending between the cross-bars of the truck with which said head adjustably engages.

The invention further consists in the peculiar arrangement, construction, and combination of parts, as hereinafter described and claimed.

Figure 1 is a longitudinal section through a truck to which my attachment is applied. Fig. 2 is a longitudinal section of the attachment. Fig. 3 is a cross-section on line $x\ x$, Fig. 2; and Fig. 4 is a perspective view of one of the members of the attachment.

A is a hand-truck of any suitable construction, having the usual cross-bars B.

C is a bar extending between and secured to the cross-bars B. This bar C is slotted longitudinally at $a$ and is provided on its rear face with a series of teeth $b$, preferably in the form of ratchet-teeth. The bar C is preferably bolted to the cross-bars B and at its opposite ends is provided with recesses $c$, with which the heads of said bolts engage.

D is a head provided on one face with complementary ratchet-teeth $d$, adapted to engage with the teeth $b$. This head is provided with an aperture $e$ in line with the slot $a$ of the bar C.

E is a bar provided at one end with a hooked head $f$, preferably provided with a series of points or teeth $f'$ for engaging with the articles to be loaded. The shank of the bar E is also provided with a series of notches or teeth $g$.

H is a bolt slidingly secured in bearings I, formed in the head D and extending longitudinally thereof. The free end of this bolt is adapted to engage with the notches or teeth $g$ of the bar E, the engagement being such that said bar is permitted to pivot upon said bolt and swing through a limited angle. The bolt H is normally held in position to engage with the said notches or teeth by a spring J, and to permit of disengaging said bolt from said teeth the former is provided with a handle L.

The device being constructed as shown and described, when not in use the hooked bar E may be adjusted with its head or hook pressing against the front face of the bar C, in which position it is held by the engagement of the bolt H with one of the notches $g$, and this also serves to hold the head D in engagement with the notched bar C. When it is desired to load an article—as, for instance, a barrel—upon the truck, the latter is moved up so that its nose presses against the article, and the bolt H is then retracted by means of the handle L, so that the bar E may be moved to engage the hook $f$ with the chime of the barrel. As soon as thus engaged the operator releases the handle L, permits the bolt H to lock in one of the notches, after which the handles of the truck may be drawn downward to pull said barrel over upon the truck. It is to be noticed that when the barrel or other article is thus drawn over upon the truck it is likely to slip more or less upon the nose of said truck, so that if the arm E were rigidly secured in position its hook would disengage from the chime. This difficulty I have avoided by forming the engagement between said bolt H and arm E so that the latter is free to swing through a limited angle. The result is that any movement or slipping of the article over the nose of the truck is compensated for by a swinging of the arm E, which permits the hook $f$ to retain its engagement. Thus with my construction it is unnecessary to insert the nose of the truck beneath the article to be loaded thereon, which both diminishes the labor required in loading and also the time consumed.

What I claim as my invention is—

1. A loading attachment for trucks, comprising a longitudinally-slotted bar secured to the body of the truck, a head having a longitudinally-adjustable locking engagement with said bar and apertured in line with said slot, a hooked member having a shank passing rearwardly through said slot and aperture, and a bolt on said head for pivotally locking said shank thereto in its different positions of adjustment.

2. A loading attachment for trucks comprising a longitudinally-slotted bar secured to the body of the truck, and notched on its rear face, a head having a complementary face engaging said notched bar, and an aperture in line with said slot, a hooked member having a shank provided with a series of notches therein and passing rearwardly through said slot and aperture and a bolt longitudinally slidable in bearings on said head having its end shaped to engage said notches in said shank and lock the latter from longitudinal movement, while permitting of a limited swinging movement thereof in the plane of said slot.

In testimony whereof I affix my signature in presence of two witnesses.

FRANK J. FAIRCHILD.

Witnesses:
M. B. O'DOGHERTY,
H. C. SMITH.